(12) United States Patent
Yang et al.

(10) Patent No.: US 7,128,324 B2
(45) Date of Patent: *Oct. 31, 2006

(54) HAMMERLOCK CHUCK

(75) Inventors: Guimo Yang, Manshan Wendeng (CN); Xingda Tan, Manshan Wendeng (CN)

(73) Assignee: Shandong Weida Machinery Co., Ltd. (CN)

( * ) Notice: Subject to any disclaimer, the term of this patent is extended or adjusted under 35 U.S.C. 154(b) by 7 days.

This patent is subject to a terminal disclaimer.

(21) Appl. No.: 11/048,098

(22) Filed: Jan. 31, 2005

(65) Prior Publication Data

US 2005/0161890 A1      Jul. 28, 2005

Related U.S. Application Data

(63) Continuation of application No. 10/190,005, filed on Jul. 3, 2002, now Pat. No. 6,848,691, which is a continuation-in-part of application No. PCT/CN02/00375, filed on May 25, 2002.

(30) Foreign Application Priority Data

Jun. 10, 2001 (CN) ................................. 01 1 15016

(51) Int. Cl.
B23B 31/16      (2006.01)

(52) U.S. Cl. ........................................ 279/62; 279/902

(58) Field of Classification Search ................. 279/60, 279/61, 62, 125, 140, 902; B23B 31/16
See application file for complete search history.

(56) References Cited

U.S. PATENT DOCUMENTS

| 573,189 | A | 12/1896 | Vogel |
|---|---|---|---|
| 4,660,841 | A | 4/1987 | Chouinard |
| 5,458,345 | A | 10/1995 | Amyot |
| 5,499,829 | A | 3/1996 | Rohm |
| 5,573,254 | A | 11/1996 | Huff et al. |
| 5,741,016 | A | 4/1998 | Barton et al. |
| 5,816,582 | A | 10/1998 | Steadings et al. |
| 5,816,584 | A | 10/1998 | Miles et al. |
| 5,924,702 | A | 7/1999 | Huff et al. |
| 5,957,469 | A | 9/1999 | Miles et al. |
| 6,260,856 | B1 | 7/2001 | Temple-Wilson |
| 6,296,257 | B1 | 10/2001 | Huff et al. |
| 6,341,783 | B1 | 1/2002 | Rohm |
| 6,390,481 | B1 | 5/2002 | Nakamuro |

(Continued)

FOREIGN PATENT DOCUMENTS

EP      0 710 519 A2      5/1996

(Continued)

*Primary Examiner*—Daniel W. Howell
(74) *Attorney, Agent, or Firm*—Brinks Hofer Gilson & Lione; G. Peter Nichols (57) ABSTRACT

A chuck for use with a manual or powered driver that may also be used for hammer drilling. The chuck is constructed so that during normal operation for its intended purpose, the jaws holding a shaft for a tool do not loosen. The chuck includes at least one pawl to engage teeth on a gear ring such that rotation of a ring driver in a jaw gripping direction causes the gear ring to rotate. When the jaws tightly grip the shaft, the gear ring will frictionally engage a portion of the chuck so that the gear ring is rotationally locked to the chuck body. At the same time, the pawl engages the gear ring such that rotation of the ring driver and thus movement of the jaws in a non-jaw gripping direction is prevented during normal use of the hammerlock chuck.

20 Claims, 5 Drawing Sheets

U.S. PATENT DOCUMENTS

| | | |
|---|---|---|
| 6,517,088 B1 | 2/2003 | Rohm |
| 6,550,785 B1 | 4/2003 | Rohm |
| 6,554,289 B1 | 4/2003 | Lin |
| 6,581,942 B1 | 6/2003 | Rohm |
| 6,659,474 B1 | 12/2003 | Sakamaki et al. |
| 6,824,141 B1 | 11/2004 | Sakamaki et al. |
| 6,843,485 B1 | 1/2005 | Sakamaki et al. |
| 6,848,691 B1 | 2/2005 | Yang et al. |
| 6,959,931 B1 * | 11/2005 | Sakamaki et al. ............ 279/62 |
| 6,991,238 B1 * | 1/2006 | Yang et al. .................... 279/62 |
| 2003/0137113 A1 | 7/2003 | Sakamaki et al. |
| 2004/0021275 A1 | 2/2004 | Sakamaki et al. |
| 2004/0217558 A1 | 11/2004 | Yang et al. |
| 2004/0227309 A1 | 11/2004 | Rohm |

FOREIGN PATENT DOCUMENTS

JP          1-92009          4/1989

* cited by examiner

HAMMERLOCK CHUCK

The present application is a continuation of U.S. Ser. No. 10/190,005 filed Jul. 3, 2002 now U.S. Pat. No. 6,848,691, which is a continuation-in-part application of PCT/CN02/00375 filed May 25, 2002 and published in English on Dec. 19, 2002 as PCT WO02/100583 and which claims priority to Chinese patent application no. 01115016.5 filed Jun. 10, 2001, the entire contents of each are incorporated herein by reference.

BACKGROUND OF THE INVENTION

The present invention generally relates to chucks for use with drills or with electric or pneumatic power drivers. More particularly, the present invention relates to a keyless chuck that may be tightened or loosened by hand or by actuation of the driver motor. The keyless chuck of the present invention has particular applicability with hammer-type drills or drivers.

Both hand and electric or pneumatic tool drivers are well known. Although twist drills are the most common tools used with such drivers, the tools may also comprise screwdrivers, nut drivers, burrs, mounted grinding stones, and other cutting or abrading tools. Since the tools may have shanks of varying diameter or the cross-section of the tool shank may be polygonal, the device is usually provided with a chuck that is adjustable over a relatively wide range. The chuck may be attached to the driver by a threaded or tapered bore.

A wide variety of chucks have been developed in the art. In the simplest form of chuck, three jaws spaced circumferentially approximately 120 degrees apart from each other are constrained by angularly disposed passageways in a body attached onto the drive shaft and configured so that rotation of the body in one direction with respect to a constrained nut engaging the jaws, forces the jaws into gripping relationship with the cylindrical shank of a tool, while rotation in the opposite direction releases the gripping relationship. Such a chuck may be keyless if it is rotated by hand.

Despite the success of such keyless chucks, varying configurations of keyless chucks are desirable for a variety of applications. In particular, it is desirable to provide a chuck for use in a hammer drilling application. In a conventional chuck used for hammer drilling, the vibration that results from use of the tool can cause the jaws to loosen their grip around the shaft of the tool. This can have undesirable consequences, both for the work piece and for the operation of the tool.

One solution to that problem is proposed in U.S. Pat. No. 5,816,582. In that patent, however, the chuck requires a front sleeve that has a number of ribs and indentations that may increase the cost and complexity of the chuck. Accordingly, it would be desirable to provide a keyless chuck that requires fewer components and/or lower manufacturing cost.

SUMMARY

The present invention provides a chuck for use with a manual or powered driver that can be used in a hammer drilling operation. The chuck includes a body having a nose section with an axial bore formed therein, a tail section, and jaw housings angularly disposed in the nose section and intersecting the axial bore. A plurality of jaws corresponding to the jaw housings are provided so that each jaw is slidably disposed in a corresponding jaw housing. The jaws have a gripping surface formed on one side (end) and threads formed on the opposite side (end).

A gear ring is rotatably mounted about the body and is configured to frictionally lock to the body. The gear ring is in operative engagement with the threads on the jaws such that when the gear ring is rotated with respect to the body, the jaws will be moved.

At least one pawl is rotatably associated with the gear ring and is configured such that when the gear ring is frictionally locked to the body, the pawl engages the gear ring until application of sufficient torque to overcome the engagement of the pawl with the gear ring. Accordingly, in operation, when the jaws tighten on the shaft of a tool or workpiece, the gear ring is locked to the body and the pawl engages the gear ring so that the jaws are prevented from moving in a non-jaw gripping direction during normal use of the hammerlock chuck.

In another embodiment, the chuck includes a body, a thrust ledge, and jaws slidably positioned in passageways formed in the body. The chuck further includes a ring nut rotatably mounted relative to the body and in engagement with threads on the jaws. A ring driver is disposed in driving engagement with the ring nut so that when the ring driver is rotated with respect to the body, the jaws are moved to grip the shaft of a tool. A gear ring is rotatably located about the body. At least one pawl is provided to engage teeth on the gear ring such that rotation of the ring driver in a jaw gripping direction causes the gear ring to rotate.

In operation, when the ring nut is tightened so that the jaws tightly grip a shaft of a tool or workpiece, the gear ring will frictionally engage the thrust ledge so that the gear ring is rotationally locked to the body. In addition, the pawl engages the gear ring such that rotation of the ring driver and thus movement of the jaws in a non-jaw gripping direction is prevented during normal use of the hammerlock chuck.

In another embodiment, a hammerlock chuck includes a body having a nose section, a middle section, a tail section, and a thrust ledge. An axial bore is formed in the body and it extends from the forward section to the rear section. A plurality of angularly arranged jaw housings are also provided in the body such that the jaw housings intersect the axial bore in the nose section.

A plurality of jaws corresponding to the number of jaw housings is provided to engage a shaft of a tool or workpiece. Each jaw is slidably disposed in a corresponding housing. The jaws have a gripping surface on one side (end) and a threaded surface on the opposite side (end).

A ring nut is disposed for rotation about the body and to engage the jaw threads. A sleeve is preferably rotatably associated with the nut such that rotation of the sleeve with respect to the body causes the jaws to move.

At least one pawl is rotatably associated with the sleeve. In one embodiment, a ring driver is connected to the nut and the sleeve such that rotation of the sleeve with respect to the body causes the sleeve, the ring driver, and the ring nut to simultaneously rotate. Where a ring driver is provided, the pawl may be separate from the ring driver or may be integrally provided as part of the ring driver. In a preferred embodiment, the pawl is a spring pawl.

A gear ring is rotatably located about the body such that rotation of the sleeve causes the gear ring to also rotate in the same direction. In one embodiment, the pawl engages the gear ring to rotationally drive the gear ring as the sleeve is rotated.

When the gripping surface of the jaws contact the shaft of a tool or workpiece, the gear ring will frictionally engage the thrust ledge sufficient to rotationally lock the gear ring to the body. Upon further rotation of the sleeve, the pawl engages the gear ring with a restraining torque such that rotation of the sleeve in a non-jaw gripping direction is prevented during normal use of the hammerlock chuck. The pawl will engage the gear ring until such time as the sleeve is rotated in a non-jaw gripping direction with a torque sufficient to exceed the restraining torque. Thereafter, as the sleeve is rotated in a non-jaw gripping direction, the gear ring and ring nut likewise rotate causing the jaws to move away from the shaft of the tool.

Accordingly, it is an object of the present invention to provide an improved hammerlock chuck such that vibration during use does not cause the jaws to loosen their grip around the shaft of the tool. It is another object of the present invention to provide a keyless chuck that has a minimum number of individual components that must be assembled.

These and other objects are achieved by providing a hammerlock chuck according to the present invention as described in greater detail below.

BRIEF DESCRIPTION OF THE DRAWINGS

Use of the same reference numerals in the following specification and drawings is intended to represent the same or analogous features or elements of the invention.

DESCRIPTION

Figures 1, 1A, 1B:
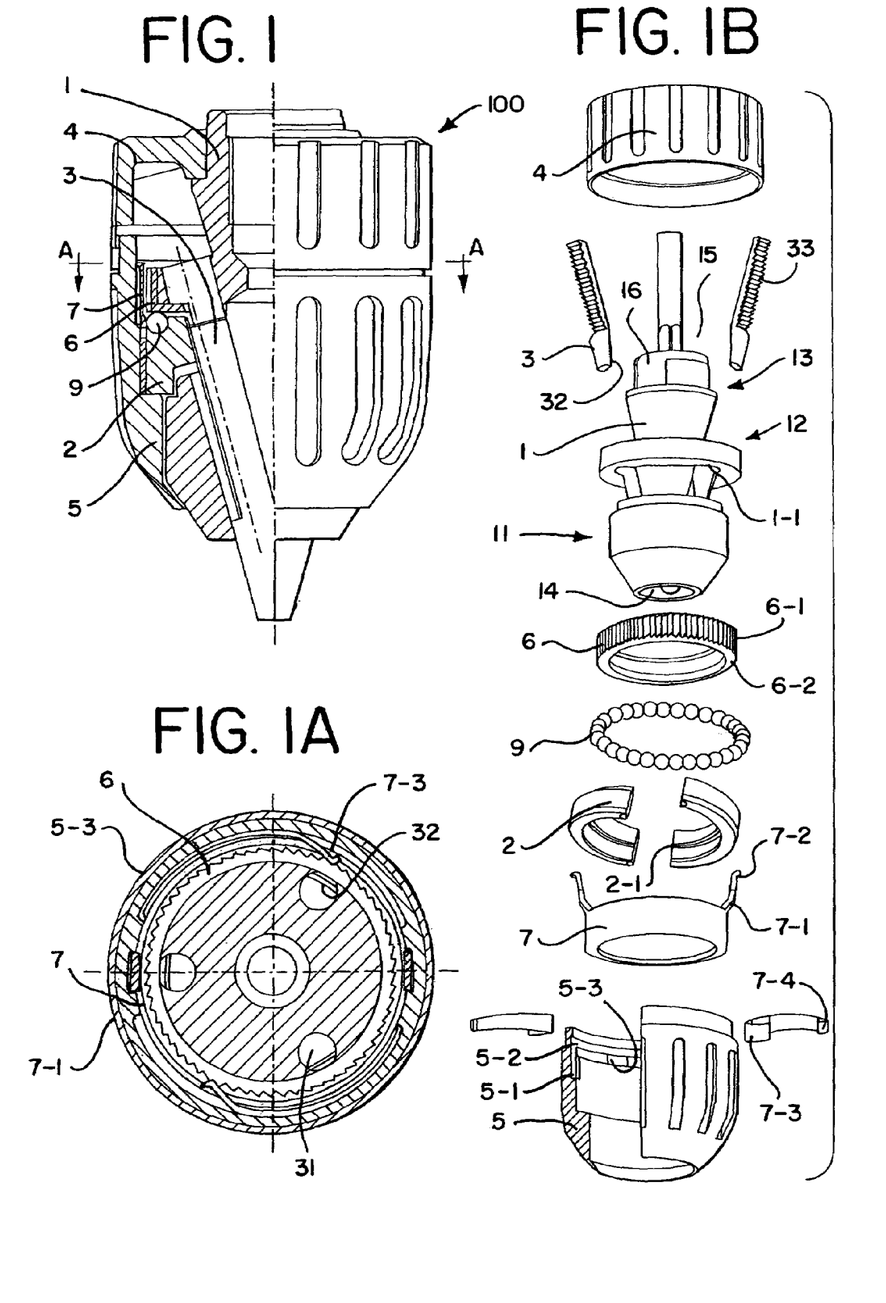
FIG. 1 is a front plan view partly in section of one embodiment of the hammerlock chuck of the present invention.
FIG. 1A is a top sectional view of the hammerlock chuck of FIG. 1 along line A—A.
FIG. 1B is an exploded view of the hammerlock chuck of FIG. 1.

Turning now to FIG. 1, a hammerlock chuck in accordance with the present invention is illustrated. Hammerlock chuck 100 includes a front sleeve 5, an optional rear sleeve 4, a body 1, and a plurality of jaws 3. The body 1 is generally cylindrical in shape and includes a nose or forward section 11, a middle section 12, and a tail or rearward section 13. An axial bore 14 is formed in the nose section 11 of the body 1. The axial bore 14 is somewhat larger than the largest tool shank that the chuck is designed to accommodate.

A threaded bore may be formed in the tail section to mate with the drive shaft of a powered or hand driver (not shown). While a threaded bore may be used, the threaded bore could be replaced with a tapered bore or other suitable shape to mate with a drive shaft. The threaded bore and the axial bore may communicate at the middle section 12 of the body 1. The tail section 13 of the body 1 can include a rear portion 15 with a shaped surface 16 to mate and receive the optional rear sleeve 4.

Figures 2, 2A, 2B:
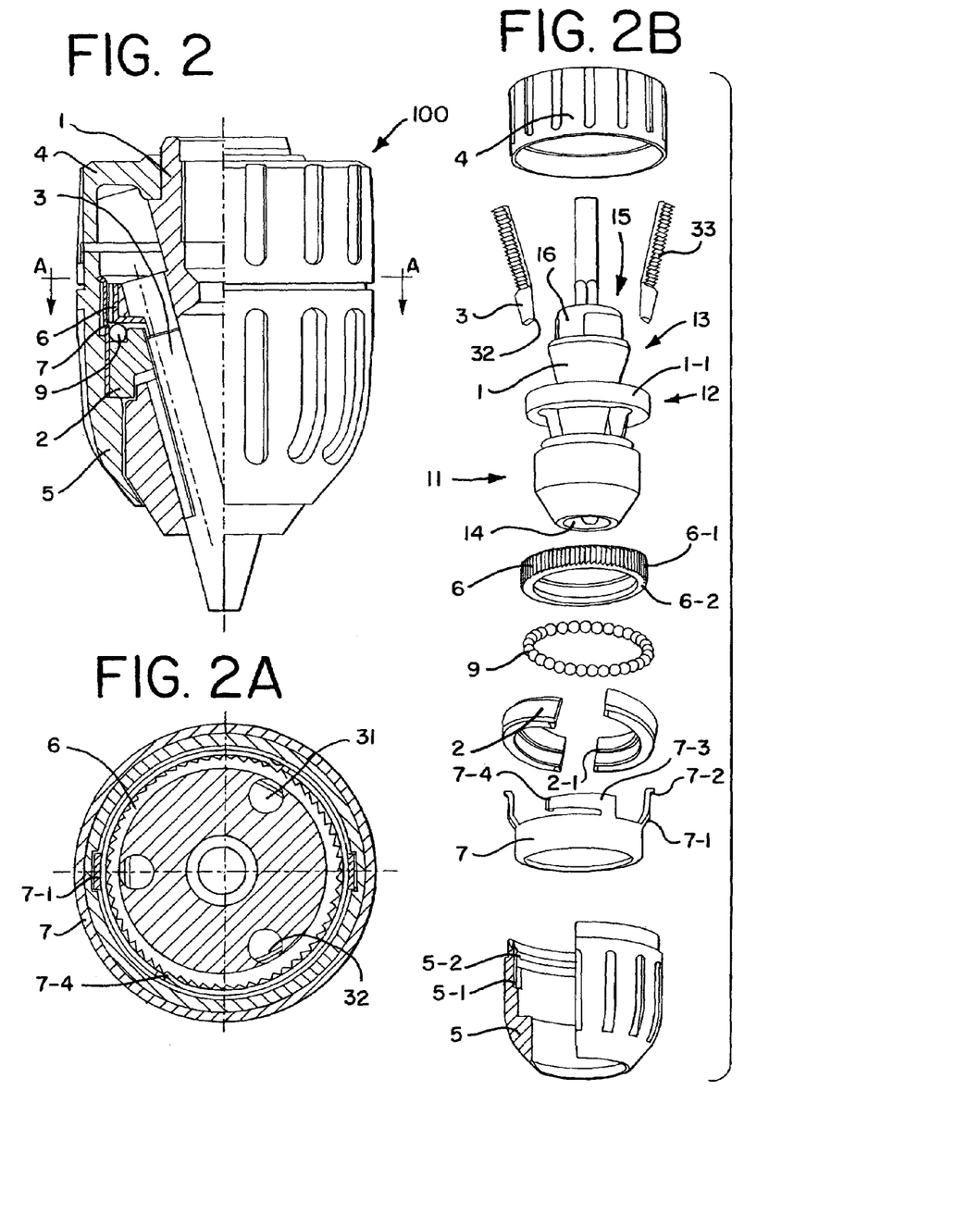
FIG. 2 is a front plan view partly in section of another embodiment of the hammerlock chuck of the present invention.
FIG. 2A is a top sectional view of the hammerlock chuck of FIG. 2 along line A—A.
FIG. 2B is an exploded view of the hammerlock chuck of FIG. 2.
Figures 3, 3A, 3B:
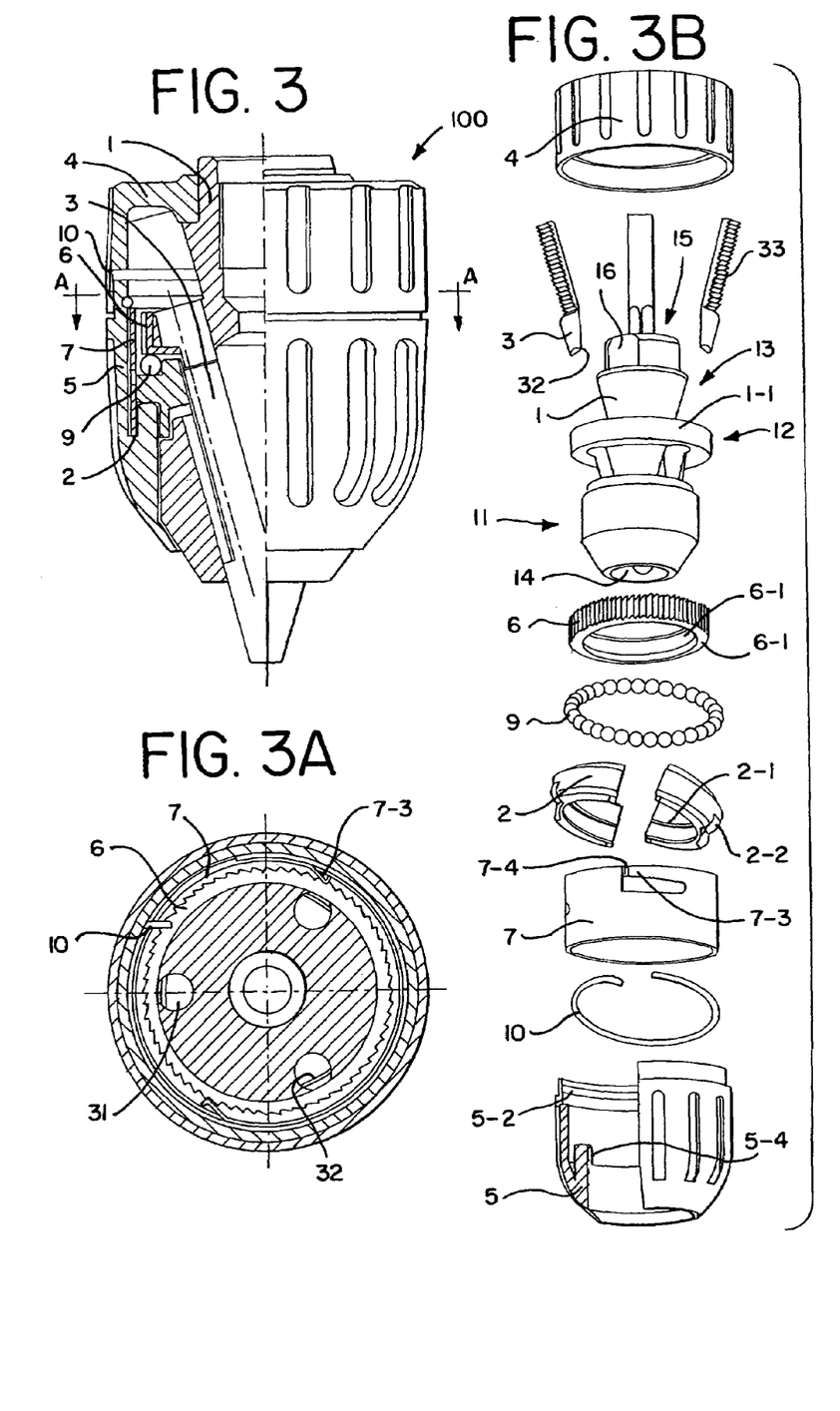
FIG. 3 is a front plan view partly in section of another embodiment of the hammerlock chuck according to the present invention.
FIG. 3A is a top sectional view of the hammerlock chuck of FIG. 3 along line A—A.
FIG. 3B is an exploded view of the hammerlock chuck of FIG. 3.

As best seen in FIGS. 1A, 2A, or 3A, a plurality of jaw housings or passageways 31 are formed in the body 1 to correspondingly accommodate or house each jaw 3. While a number of jaws 3 may be provided according to manufacturing and other considerations, typically three jaws are provided. Referring to FIG. 1A, when three jaws are used, each jaw 3 is preferably separated from the adjacent jaw 3 by an arc of approximately 120 degrees.

Typically, the longitudinal axes of the housings 31 and the jaws 3 are angled with respect to the longitudinal or axial axis of the chuck and intersect the chuck axis at a common point ahead of the chuck body. Each jaw 3 has a tool engaging face or gripping surface 32 that is generally parallel to the longitudinal axis of the chuck body and that is located on one side or end of the jaw 3. Each jaw 3 also has threads 33 on its opposite side or end. The threads 33 may be any suitable type and have any suitable pitch as is apparent to one of skill in the art.

As illustrated in FIGS. 1–3, the body 1 includes a thrust ledge 1-1 that, in a preferred embodiment, is integral with the body 1 and constitutes the thrust-receiving portion of the body. It is, however, contemplated that the thrust ledge 1-1 may be a separate component from the body 1. The thrust ledge 1-1 is adapted for engagement with a gear ring 6 as will be described in more detail below. The thrust ledge 1-1 includes a plurality of jaw guideways (not shown) that are aligned with the passageways or housings 31 to permit movement (retraction and extension) of the jaws 3 through the guideways.

Figure 9:
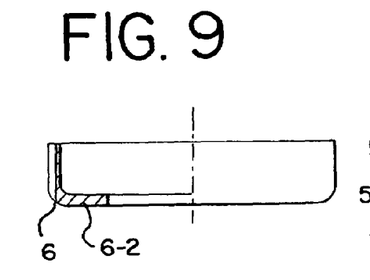
FIG. 9 is a cross sectional view of a gear ring useful in the chuck of the present invention.
Figure 10:
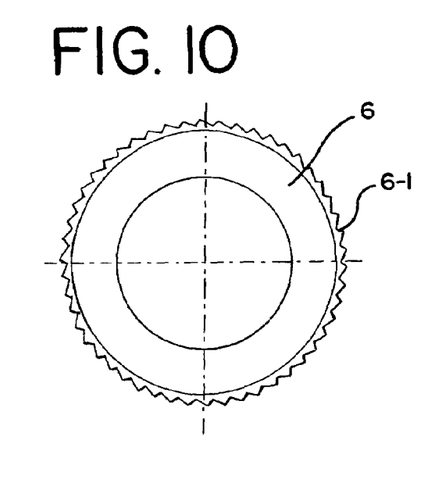
FIG. 10 is a top view of a gear ring useful in the chuck of the present invention.

The hammerlock also includes a gear ring 6 that has teeth 6-1 about its outer periphery, as best seen in FIG. 10. The teeth 6-1 are preferably one directional, the purpose of which will become clear. The gear ring also has a ledge 6-2, as shown in FIGS. 1B and 9, that contacts the thrust ledge 1-1 during certain operations. The gear ring 6 rotatably surrounds the body 1 and, in particular, the thrust ledge 1-1. In other words, the gear ring 6 can move relative to the body 1 and the ring nut 2.

The present invention further includes a friction reducing surface or rolling element shown in the figures as a bearing 9. The friction reducing surface 9 may have any suitable configuration such as a plurality of ball bearings, a bearing assembly, a coating or the like. The friction reducing surface 9 sits between the ring nut 2 and the gear ring 6. The ring nut 2 is rotatably mounted with respect to the body 1 and is in engagement with the threads 33 on the jaws 3. Accordingly, the ring nut 2 includes threads 2-1 for mating with the threads 33 on the jaws 3 so that when the ring nut 2 is rotated with respect to body, the jaws 3 will be advanced or retracted in a particular direction along the longitudinal axis of the passageways. This direction has a component along the longitudinal axis of the body.

As shown in FIG. 3, in one embodiment, the ring nut 2 may include drive slots 2-2 that mate with drive ribs 5-4 provided on the inner surface of the front sleeve 5. In this way, the ring nut 2 is keyed to the front sleeve 5 So that when the front sleeve 5 is rotated, the ring nut 2 will rotate with the sleeve 5 and move the jaws 3 as described above. In one embodiment, the ring nut 2 is configured in the form of a one-piece nut, but could be formed in two or more pieces that could be joined together or could merely be concentrically disposed.

As shown in FIG. 1, a ring driver 7 is configured and disposed to cooperate with the ring nut 2 and the front sleeve 5. The ring driver 7 is connected to the ring nut 2 such that when the ring driver 7 rotates, the ring nut 2 rotates, causing the jaws 3 to move. Preferably, the ring driver 7 is securely connected to the ring nut 2 such as by welding or other means.

Figures 6A, 6B:
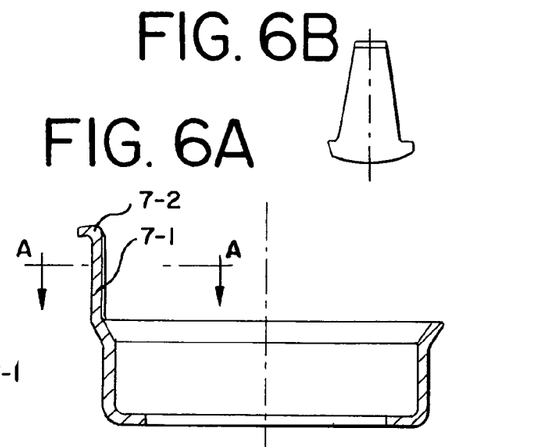
FIG. 6 is a cross sectional view of a ring driver similar to that illustrated in FIG. 1B, except the ring driver in FIG. 6 has only a single arm.
Figure 7:
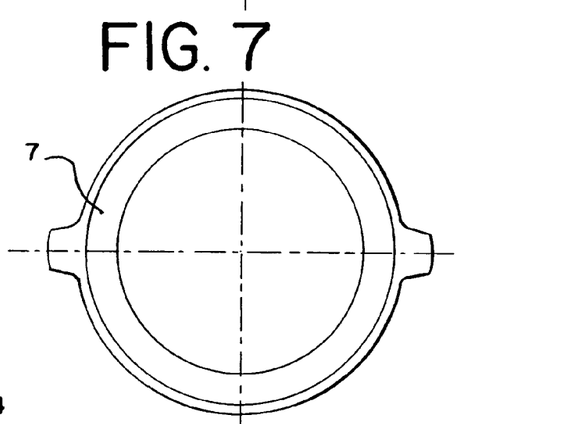
FIG. 7 is a top view of the ring driver illustrated in FIG. 6.

The ring driver 7 also cooperates with the front sleeve 5. In one embodiment, best seen in FIG. 1 the ring driver 7 has at least one arm 7-1 connected to a foot 7-2. In a preferred embodiment, the ring driver 7 has a pair of arms and feet, opposite each other. In an alternative embodiment, best seen in FIGS. 6A, 6B, and 7, the ring driver 7 is provided with only a single arm 7-1.

The arm 7-1, whether one or more are provided, engages a drive slot 5-1 provided on the inner surface of the front sleeve 5. Likewise, the foot 7-2 engages an annular groove 5-2 also provided on the inner surface of the front sleeve 5 SO that there is no axial movement between the ring gear 7 and the front sleeve 5. Preferably, more than one drive slot 5-1 is provided along the inner periphery. More preferably, the drive slots 5-1 are spaced from each other a distance about the same as the distance between each arm 7-1. Engagement of the drive slot 5-1 and the arms 7-1 causes the gear ring 6 to rotate as the front sleeve 5 rotates.

Figure 8:
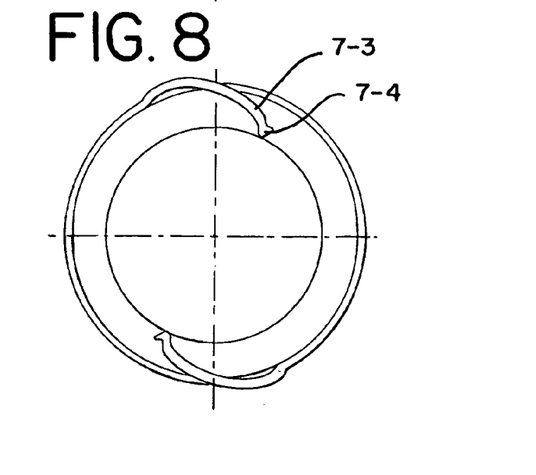
FIG. 8 a cross sectional view of the ring driver illustrated in FIG. 3B.

In another embodiment best seen in FIGS. 3-B and 8, the ring driver arms and feet are eliminated and the ring driver cooperates with the front sleeve 5 by securing the ring driver 7 to the ring nut 2, which in turn, is keyed to the front sleeve 5 by the drive slots 2-2 engaging the drive ribs 54. In this embodiment, a locking spring 10 or similar mechanism engages annular groove 5-2 to axially secure the ring driver 7 with the front sleeve 5.

Figure 11:
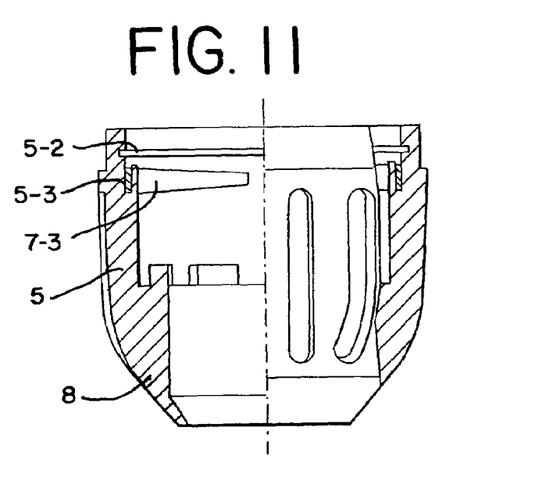
FIG. 11 is a front plan view partly in section of one embodiment of the hammerlock chuck of the present invention.
Figure 12:
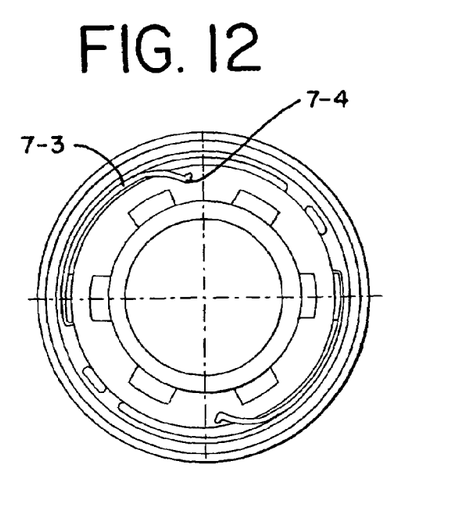
FIG. 12 is a top view of the chuck illustrated in FIG. 11.

In further accordance with the present invention, at least one pawl 7-3 is provided and is rotatably associated with the gear ring 6 and the sleeve 5. Preferably, the pawl 7-3 has a boss 7-4 at one end. The boss 7-4 is configured to engage the teeth 6-1 of the gear ring 6. As shown in FIGS. 1 and 11, two pawls are provided and each engages a slot 5-3 provided on the inner surface of the front sleeve to be driven when the sleeve is rotated. Accordingly, when the front sleeve 5 is rotated, the pawl(s) 7-3 are likewise rotated. As better seen in FIGS. 11 and 12, the pawls 7-3 are biased inwardly so that each boss 7-4 of each pawl 7-3 will be biased in contact with the teeth 6-1 of the gear ring 6.

Figure 4:
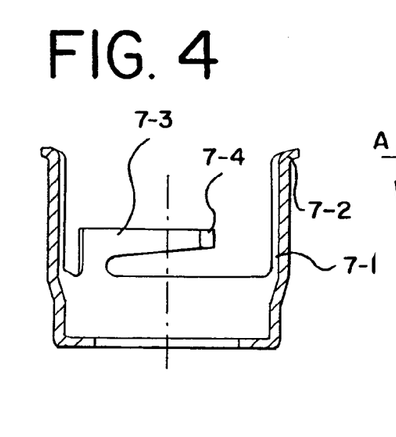
FIG. 4 is a cross sectional view of the ring driver illustrated in FIG. 2B.
Figure 5:
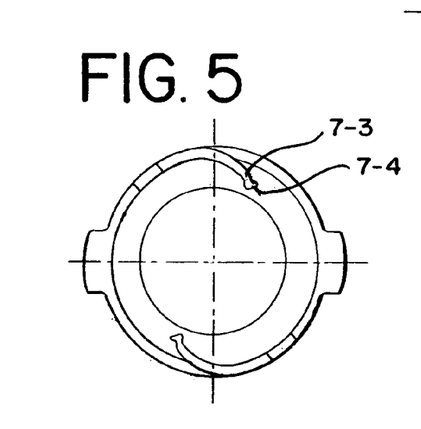
FIG. 5 is a top view of the ring driver illustrated in FIG. 2B.

In an alternative embodiment, the pawl 7-3 is formed integral with the ring driver 7, as shown in FIGS. 2B and 3B. Preferably, the pawl 7-3 is resilient. In the embodiment shown in FIG. 2B, as best seen in FIGS. 4 and 5, two pawls 7-3 are provided integral with the ring driver 7. The pawls 7-3 are preferably made from a resilient material and are biased inward of the circumference of the ring driver 7, as best seen in FIG. 5. Accordingly, each boss 7-4 of each pawl 7-3 will be biased in contact with the teeth 6-1 of the gear ring 6.

Similarly, in the embodiment shown in FIG. 3B, as best seen in FIG. 8, two pawls 7-3 are provided integral with the ring driver 7. The pawls 7-3 are preferably made from a resilient material and are biased inward of the circumference of the ring driver 7, as best seen in FIG. 8. Accordingly, each boss 7-4 of each pawl 7-3 will be biased in contact with the teeth 6-1 of the gear ring 6.

When assembled, the boss 74 of the pawl 7-3 normally engages the teeth 6-1 of the gear ring 6 so that when the front sleeve 5 is rotated with respect to the body 1, the ring driver 7, ring nut 2, and pawl 7-3 are rotated in the same direction and because the boss 7-4 is engaged with the teeth 6-1 of the gear ring 6, the gear ring 6 also rotates in the same direction.

As noted above, the front sleeve 5 is adapted to be fitted over the nose section 11 of the chuck. As shown in FIG. 3B, at least one drive rib 5-4 of the front sleeve 5 engages a corresponding ring nut drive slot 2-2 so that front sleeve 5 and ring nut 2 will be operatively connected or keyed together. In other words, when the front sleeve 5 is rotated, the ring nut 2 will rotate with the sleeve 5. While the mating connection between the front sleeve 5 and the ring nut 2 is illustrated, it will be appreciated by one of skill in the art that any suitable method of operative connection between the front sleeve 5 and the ring nut 2 could be used within the scope of the present invention (e.g., through a ring driver 7 as discussed above).

If desired, the rear sleeve 4 may be omitted and the front sleeve 5 may be extended to the tail end of the body 1. This alternative may be desirable when a spindle lock or the like is provided on the driver or when the driver is used to tighten or loosen the jaws 3.

The exterior circumferential surface of the front sleeve 5 may be knurled or may be provided with longitudinal ribs or other protrusions to enable the operator to grip it securely. In like manner, the outer circumferential surface of the rear sleeve 4, if present, may be knurled or ribbed if desired. The front and rear sleeves may be fabricated from a structural plastic such as polycarbonate, a filled polypropylene, for example, glass filled polypropylene, or a blend of structural plastic materials. Other composite materials such as, for example, graphite filled polymerics also would be suitable in certain environments. As will be appreciated by one skilled in the art, the materials from which the chuck of the present invention is fabricated will depend on the end use of the chuck, and the above are provided only by way of example.

It will be appreciated that the rear sleeve 4 may be fixed to the body 1, while the front sleeve 5 is operatively associated with gear ring 6, ring driver 7, and/or ring nut 2 and is rotatable with respect to the body 1. Because of the interaction between the threads 33 on the jaws 3 and the threads 2-1 on the ring nut 2, relative movement of the front 5 and the rear 4 sleeves, causes the jaws 3 to be advanced or retracted, depending upon the direction of relative movement.

In operation, as the front sleeve 5 is rotated with respect to the body 1, the jaws 3 increase the forward gripping force applied to the shaft of a tool. In addition, the gear ring 6 and friction reducing surface 9 rotate relative to the body 1 along with the ring driver 7. At the same time, a corresponding axial force is increasingly exerted rearwardly through the jaws 3 to the ring nut 2, friction reducing surface 9, and gear ring 6. This rearward axial force is transmitted through the gear ring 6 to the body 1, and particularly to the thrust ledge 1-1. After the jaws 3 have gripped the tool shaft, the rearward axial force produces a frictional force between the gear ring 6 and the thrust ledge 1-1 so that the gear ring 6 is frictionally locked to the body 1 and cannot rotate.

This resulting frictional force between the thrust ledge 1-1 of the body 1 and the gear ring 6 is directed circumferentially in a direction opposite to the direction that the front sleeve 5, ring driver 7, ring nut 2, and pawl 7-3 are being rotated. When the force of the sliding friction between the gear ring 6 and the thrust ledge 1-1 is greater than the compound force of the pawl on peripheral movement of the gear ring 6, the gear ring 6 and the thrust ledge 1-1 become immobile relative to each other. Continuing to apply force to the sleeve 5, the friction reducing surface 9 begins to move relative to the gear ring 6. The ring nut 2 also begins to turn relative to the gear ring 6 and the chucking effect is converted to the axial force of the ring nut 2 and is transferred to the thrust ledge 1-1 by the friction reducing surface 9 and the gear ring 6 until it is tightened and becomes immobile. Accordingly, this resulting frictional force acts to restrain circumferential movement of gear ring 6 with respect to thrust ledge 1-1 of the body 1. Thus, when the jaws 3 are tightened around the shaft of a tool in the desired manner, the resulting frictional force prevents further rotation of the gear ring 6 with respect to the body 1. In this manner, the gear ring 6 becomes locked to the body 1 and therefore becomes selectively non-rotatably disposed with respect to the body 1.

In other words, when the friction of the gear ring 6 against the thrust ledge 1-1 becomes greater than the driving force between the pawl 7-3 and teeth 6-1 of the gear ring 6, the gear ring 6 will become stationary or frictionally locked to the body 1 (i.e., locked rotatably with respect to the body). The pawl 7-3, however, will continue to rotate with the sleeve 5 as rotation of the sleeve 5 continues. In the preferred embodiment, where the pawl 7-3 is a spring, the continued rotation of the sleeve 5, causes the pawl 7-3 to bend and the boss 7-4 to disengage from successive teeth (i.e., the boss will "pop up" over the teeth and create a clicking sound).

Because the ring nut 2 is operatively associated with the front sleeve 5, it still rotates with the sleeve 5 causing the jaws 3 to increasingly bite into the shaft of the workpiece until the jaws 3 cannot travel further. At this point, the boss 7-4 of the pawl 7-3 engages a tooth 6-1 on the gear ring 6 to provide a restraining torque to lock the jaws 3 in place during operation of the drill, particularly when operating in a hammer mode.

In a conventional chuck used to secure a drill engaged in hammer drilling for example, the vibration that results from use of the tool tends to cause the ring nut and front sleeve to move in the direction of least resistance and, therefore, to cause the jaws to loosen (i.e., release) their grip around the shaft of the tool. In accordance with the chuck of the present invention, however, the cooperation of the boss 7-4 of the pawl 7-3 and the gear ring 6 can be controlled to produce a restraining torque that counteracts such release torque. Thus, before the front sleeve 5 can rotate with respect to the gear ring 6 (and with respect to the body secured to the gear ring 6 by the previously mentioned rearwardly acting axial force), the magnitude of the release torque allowed by the vibrations acting on the chuck must exceed the restraining torque that prevents the gear ring 6 from rotating relative to the front sleeve 5.

The desired magnitude of this restraining torque is such as to prevent vibrations from causing the front sleeve (and thus the ring driver or ring nut) to rotate relative to the body 1. This ensures that the jaws 3 do not loosen their desired grip around the tool shaft during vibration of the tool when in use for its intended purpose such as hammer drilling or any other application that involves vibrations. Upon application of a torque to the front sleeve 5 that exceeds the restraining torque, then the boss 7-4 of the pawl 7-3, which is preferably a spring pawl, will disengage from the tooth 6-1 in which it is engaged, so that the front sleeve 5, the ring driver 7, the gear ring 6, and the ring nut 2 will be selectively rendered rotatable with respect to the body 1.

To release or unlock the gear ring 6, the front sleeve 5 is rotated in a non-jaw tightening or opposite direction with sufficient torque to overcome the restraining torque. Because the rolling friction is less than the force of the sliding friction under the same stress, with the movement of the sleeve 5, the pawl 7-3 first moves and makes way relative to the teeth 6-1 of the gear ring 6 and first makes the ring nut 2 turn relative to the gear ring 6. Subsequently, as the axial pressure of the ring nut 2, the gear ring 6 and the body 1 decreases, the sliding friction between the gear ring 6 and the thrust ledge 1-1 also decreases. Rotation in this manner will cause the boss 7-4 of the pawl 7-3 to disengage from the tooth 6-1 thereby loosening frictional engagement of the gear ring 6 with the body 1 so that the gear ring 6 will again be carried by the pawl 7-3 toward the non-jaw tightening direction.

While the above description is set forth with respect to a keyless chuck, it should be appreciated that the principles of the present invention are equally applicable to a keyed chuck, and such is within the scope of the present invention. These and other modifications and variations to the present invention may be practiced by those of ordinary skill in the art, without departing from the spirit and scope of the present invention, which is more particularly set forth in the appended claims. In addition, it should be understood that aspects of the various embodiments might be interchanged both in whole and in part. Furthermore, those of ordinary skill in the art will appreciate that the foregoing description is by way of example only, and is not intended to be limitative of the invention so further described in such appended claims.

What is claimed is:

1. A hammerlock chuck comprising:
   a. a body having a nose section having an axial bore and jaw housings angularly disposed in the nose section and intersecting the axial bore;
   b. a jaw slidably disposed in a corresponding jaw housing and having threads formed on one side;
   c. a gear ring rotatably mounted about the body and being configured to frictionally lock to the body, the gear ring in operative engagement with the threads on the jaws such that when the gear ring is rotated with respect to the body, the jaws will be moved;
   d. a ring nut disposed for rotation about the body and engaging the jaw threads; and,
   e. at least one pawl rotatably associated with the gear ring and being configured such that when the gear ring is frictionally locked to the body, the pawl engages the gear ring until application of sufficient torque to overcome the engagement of the pawl with the gear ring.

2. The hammerlock chuck of claim 1 wherein the ring nut is a one-piece nut.

3. The hammerlock chuck of claim 1 further comprising a friction-reducing structure between the gear ring and the ring nut.

4. The hammerlock chuck of claim 1 further comprising a ring driver disposed about the ring nut wherein rotation of the ring driver results in rotation of the ring nut.

5. The hammerlock chuck of claim 4 wherein the ring driver is fixed to the ring nut.

6. The hammerlock chuck of claim 1 further comprising a sleeve rotatably surrounding the nose section, wherein rotation of the sleeve with respect to the body causes the jaws to move.

7. The hammerlock chuck of claim 1 further comprising a sleeve disposed in driving engagement with the ring nut.

8. The hammerlock chuck of claim 7 wherein the ring nut includes at least one slot for receipt of a corresponding drive rib provided on the sleeve.

9. The hammerlock chuck of claim 4 further comprising a sleeve connected to the ring driver.

10. The hammerlock chuck of claim 1 wherein the at least one pawl is resilient.

11. The hammerlock chuck of claim 4 wherein the pawl is integral with the ring driver.

12. The hammerlock chuck of claim 1 wherein the body has a tail section with an axial bore formed therein to mate with a drive shaft.

13. The hammerlock chuck of claim 1 further including a rear sleeve secured to the tail section.

14. The hammerlock chuck of claim 1 wherein the gear ring has an outer periphery with teeth.

15. The hammerlock chuck of claim 14 wherein the teeth are one directional.

16. A hammerlock chuck comprising:
   a. a body having a nose section and a thrust ledge, the body having an axial bore and a plurality of angularly arranged jaw housings;
   b. a plurality of jaws corresponding to the number of jaw housings, each jaw slidably disposed in a corresponding housing, the jaws having a threaded surface on one side;
   c. a ring nut disposed for rotation about the body and engaging the jaw threads;
   d. a sleeve rotatably associated with the ring nut;
   e. at least one pawl rotatably associated with the sleeve; and,
   f. a gear ring rotatably located about the body wherein rotation of the sleeve in a jaw gripping direction causes the gear ring to frictionally engage the thrust ledge and to rotationally lock the gear ring to the body, and upon the gear ring being rotationally locked to the body, the at least one pawl engages the ring gear such that rotation of the sleeve in a non-jaw gripping direction is prevented during normal use of the hammerlock chuck.

17. The hammerlock chuck of claim 16 further comprising a ring driver disposed about the ring nut.

18. The hammerlock chuck of claim 17 wherein the ring driver is connected to the ring nut.

19. The hammerlock chuck of claim 18 wherein the ring driver is securely connected to the ring nut.

20. The hammerlock chuck of claim 19 wherein the ring nut is a one-piece nut.

* * * * *